(12) United States Patent
Schroeder et al.

(10) Patent No.: US 9,647,403 B2
(45) Date of Patent: May 9, 2017

(54) ELECTRIC MOTOR/GENERATOR WITH EASILY REPLACEABLE BRUSH HOLDER AND BRUSHES

(71) Applicant: Robert Bosch GmbH, Stuttgart (DE)

(72) Inventors: Bernd Schroeder, Esslingen (DE); Zeljko Lubina, Reutlingen (DE); Matthias Gesellmann, Reutlingen (DE); Cornelia Mauer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 13/707,450

(22) Filed: Dec. 6, 2012

(65) Prior Publication Data
US 2013/0140940 A1    Jun. 6, 2013

(30) Foreign Application Priority Data
Dec. 6, 2011    (DE) .................. 10 2011 087 788

(51) Int. Cl.
*H01R 39/38*   (2006.01)
*H01R 39/41*   (2006.01)
(Continued)

(52) U.S. Cl.
CPC ............ *H01R 39/38* (2013.01); *H01R 39/26* (2013.01); *H01R 39/39* (2013.01); *H01R 39/41* (2013.01);
(Continued)

(58) Field of Classification Search
CPC .......... H02K 5/14; H02K 5/141; H02K 5/143; H02K 5/145; H02K 5/146; H02K 5/148; H02K 13/003; H02K 19/365; H01R 39/18; H01R 39/24; H01R 39/26; H01R 39/38; H01R 39/381; H01R 39/383; H01R 39/385; H01R 39/386; H01R 39/388; H01R 39/39; H01R 39/40; H01R 39/41; H01R 39/415; H01R 39/42; H01R 39/44; H01R 39/62
(Continued)

(56) References Cited

U.S. PATENT DOCUMENTS 3,387,155 A * 6/1968 Krulls .......................... 310/239
3,466,481 A   9/1969 Sckerl
(Continued)

FOREIGN PATENT DOCUMENTS

DE    1275194    8/1968
DE    1613982    1/1971
(Continued)

*Primary Examiner* — Terrance Kenerly
*Assistant Examiner* — Alexander Singh
(74) *Attorney, Agent, or Firm* — Michael Best & Friedrich LLP

(57) ABSTRACT

An electrical machine (1) with a machine housing (5) receiving an electrically excited rotor (2) and a stator (10) of the electrical machine (1) and with an electronics unit (18) fastened to the machine housing (5) and electrically connected to an exciter winding (3) of the rotor (2) via at least one sliding contact (11, 12) consisting of at least one slip ring (13, 14) assigned to the rotor (2) and at least one brush (15, 16) assigned to the electronics unit (18), the brush (15, 16) being arranged displaceably in a brush holder (20). In this case it is provided that the brush holder (20) is fastened exchangeably in a guiding recess (27) of the electronics unit (18).

8 Claims, 7 Drawing Sheets

(51) Int. Cl.
*H01R 39/26* (2006.01)
*H01R 39/39* (2006.01)
*H02K 5/14* (2006.01)
*H02K 13/00* (2006.01)
*H02K 19/36* (2006.01)

(52) U.S. Cl.
CPC ............... *H02K 5/14* (2013.01); *H02K 5/145* (2013.01); *H02K 5/148* (2013.01); *H02K 5/141* (2013.01); *H02K 13/003* (2013.01); *H02K 19/365* (2013.01)

(58) Field of Classification Search
USPC ....... 310/239, 249, 232, 240, 242, 244, 245, 310/248, 233, 229
See application file for complete search history.

(56) References Cited

U.S. PATENT DOCUMENTS

| | | | | |
|---|---|---|---|---|
| 4,095,131 A | * | 6/1978 | Febonio | 310/239 |
| 4,292,560 A | * | 9/1981 | Vorndran | 310/242 |
| 4,296,346 A | * | 10/1981 | Ooki et al. | 310/242 |
| 4,344,009 A | * | 8/1982 | Reynolds | 310/242 |
| 4,347,455 A | * | 8/1982 | Major et al. | 310/239 |
| 4,859,894 A | | 8/1989 | Akutsu et al. | |
| 5,159,222 A | | 10/1992 | Southall | |
| 5,184,041 A | * | 2/1993 | Baer et al. | 310/239 |
| 5,268,605 A | * | 12/1993 | Bradfield | 310/71 |
| 6,225,717 B1 | * | 5/2001 | Burger et al. | 310/71 |
| 7,049,727 B2 | * | 5/2006 | Bocka et al. | 310/239 |
| 7,116,032 B2 | * | 10/2006 | Kashihara et al. | 310/242 |
| 7,365,470 B1 | | 4/2008 | Eger et al. | |
| 7,687,967 B2 | * | 3/2010 | Mashino | 310/239 |
| 2004/0130233 A1 | * | 7/2004 | Inoue et al. | 310/239 |
| 2006/0158057 A1 | * | 7/2006 | Huck et al. | 310/239 |
| 2007/0222328 A1 | * | 9/2007 | Mashino | H01R 39/385 310/239 |
| 2010/0001599 A1 | * | 1/2010 | Bohn et al. | 310/71 |
| 2011/0187243 A1 | * | 8/2011 | Oohashi | 310/68 D |

FOREIGN PATENT DOCUMENTS

| | | |
|---|---|---|
| DE | 2643612 | 4/1977 |
| DE | 2926163 | 1/1980 |
| DE | 2936204 | 3/1981 |
| DE | 8332700 | 3/1984 |
| DE | 102004004745 A1 | 8/2005 |
| JP | 5003655 | 1/1993 |

* cited by examiner

ELECTRIC MOTOR/GENERATOR WITH EASILY REPLACEABLE BRUSH HOLDER AND BRUSHES

BACKGROUND OF THE INVENTION

The invention relates to an electrical machine with a machine housing receiving an electrically excited rotor and a stator of the electrical machine and with an electronics unit fastened to the machine housing and electrically connected to an exciter winding of the rotor via at least one sliding contact consisting of at least one slip ring assigned to the rotor and at least one brush assigned to the electronics unit, the brush being arranged displaceably in a brush holder.

Electrical machines of the type mentioned at the beginning are known from the prior art. The electrical machine has the rotor and the stator, which are arranged at least partly in the machine housing. The electrical machine is activated by means of the electronics unit. This means that it is electrically connected to the rotor and/or the stator of the electrical machine, in order to feed electrical current to the exciter winding of the rotor and/or an exciter winding of the stator. Because the rotor rotates with respect to the machine housing, and consequently the electronics unit, during the operation of the electrical machine, the electrical connection between the electronics unit and the rotor is established via the sliding contact. This sliding contact consists of the at least one slip ring and the at least one brush. The slip ring is in this case assigned to the rotor and is provided for example on a rotor shaft, on which the rotor is also arranged to rotate therewith. The brush on the other hand is arranged in the electronics unit and is consequently usually fixed in place.

The sliding contact between the brush and the slip ring causes wear, in particular of the brush. The brush is therefore displaceable, at least in the radial direction—with respect to a longitudinal axis of the electrical machine or an axis of rotation of the rotor. The brush is usually urged in the direction of the slip ring by means of a spring element. In this way, the wear of the brush can be compensated. The brush is arranged displaceably in the brush holder. It is preferably arranged in the brush holder in such a way that it is movable only in the radial direction, that is to say in particular toward the slip ring. The brush holder is usually connected to the electronics unit in a fixed and unreleasable manner. During assembly of the electrical machine, the electronics unit is fastened by three screws directly to the machine housing, in particular a bearing plate of the machine housing.

Known for example from the prior art is DE 10 2004 004 745 A1. This shows a brush holder for an electrical machine which has a stator and a rotor. The brush holder has four receiving shafts for a plurality of carbon brushes. It is intended that all four receiving shafts are fitted with a carbon brush and that the carbon brushes are switched as pairs in parallel.

On account of the wear, it is necessary from time to time to exchange the brush. However, due to the permanent fastening of the brush holder to the electronics unit described above, it is necessary always to exchange the entire electronics unit together with the brush holder. This makes the exchange of the brush complicated and costly.

SUMMARY OF THE INVENTION

By contrast, the electrical machine has the advantage that an exchange of the brush is implemented more easily and inexpensively. For this purpose, it is provided according to the invention that the brush holder is fastened exchangeably in a guiding recess of the electronics unit. The brush is for example captively held in the brush holder, for which purpose said brush holder is preferably closed in such a way that the brush cannot be removed from it. In order nevertheless to implement an exchange of the brush independently of the electronics unit, said electronics unit has the guiding recess. The brush holder is exchangeably fastened in the guiding recess. For example, the guiding recess is a radial recess or radial receptacle for the brush holder that is provided in the electronics unit. During assembly of the electrical machine, the brush holder can be easily introduced into the guiding recess. After that, it is releasably fastened in said guiding recess, so that easy and low-cost exchange is possible.

Correspondingly, an exchange of the brush can also be performed without disassembling or exchanging the electronics unit. In this case, the brush is removed together with the brush holder from the guiding recess and a new brush holder with a new brush is inserted into the guiding recess. Once electrical contacting of the brush holder to the electronics unit has been performed, the electrical machine can be put into operation once again. The electronics unit has for example power electronics, a filter subassembly, in particular an EMC filter subassembly, and/or a heat sink of the power electronics. The guiding recess may thus be in any of these elements. It is particularly preferred however for the guiding recess to be assigned to the filter subassembly or the heat sink of the power electronics.

Usually at least two sliding contacts are necessary for supplying the exciter winding with electrical current. Correspondingly, a number of slip rings, in particular two, and a number of brushes, preferably likewise two, are provided. In this case, the number of brushes may be together in the brush holder. The brushes are advantageously arranged spaced apart from one another in the axial direction. This applies similarly to the slip rings assigned to the rotor.

A development of the invention provides that the fastening of the brush holder in the guiding recess is with non-positive or positive engagement. In principle, the brush holder may be fastened in the guiding recess in any way desired, as long as this fastening is releasable, that is to say allows the exchanging of the brush holder together with the brush. For example, the fastening is with non-positive engagement, it being possible for the brush holder to be pressed into the guiding recess in such a way that it is subsequently held in the guiding recess by pressing force, that is to say with non-positive engagement. Alternatively or in addition, fastening with positive engagement may be provided. This takes the form in particular of a gripping-behind connection or latching connection.

A development of the invention provides that the positively engaging connection is established by means of a latching connection having a latching element and a latching counter-element. The latching connection forms a gripping-behind connection, which fixes the brush holder in its assembly position in the guiding recess. During the assembly, the latching element is usually resiliently deflected in such a way that the brush holder can be introduced into the guiding recess. When the brush holder reaches its assembly position in the guiding recess, the latching element reaches a latching position, in which it interacts with the latching counter-element to hold the brush holder in the guiding recess or in the assembly position. The latching element is for example assigned to the guiding recess and is therefore located on the electronics unit. The latching counter-element on the other hand is on the brush holder. Alternatively, it can of course also be provided that the latching element is on the brush holder and the latching counter-element is on the electronics unit.

A development of the invention provides that an electrical connection between the electronics unit and the brush holder is established via a screw connection. The non-positively and/or positively engaging fastening of the brush holder on the guiding recess described above usually serves just for the mechanical fastening of the brush holder. Therefore, an electrical connection between the electronics unit and the brush holder or the brush arranged therein must be additionally established. The screw connection is provided for this purpose. The screw connection has for this purpose at least one electrically conductive contact screw, which is electrically connected both to a terminal or contact of the electronics unit and to a terminal or contact of the brush holder. Electrical current can subsequently pass via the contact screw from the electronics unit to the brush holder, and consequently via the sliding contact to the exciter winding of the rotor. Contrary to the statements made above, in the case of such electrical contacting it may also be provided that the brush holder is held in the guiding recess exclusively by means of the screw connection.

A development of the invention provides that the screw connection comprises at least one screw, which is arranged in the axial direction or the radial direction. The screw corresponds to the aforementioned contact screw. The screw may in principle be arranged in any way desired, but with particular preference its longitudinal axis points in the axial direction or radial direction—with respect to a longitudinal axis or axis of rotation of the electrical machine or the rotor. The screw connection is advantageously also accessible from outside after the assembly of the electrical machine. This applies in particular to screw heads of the screw.

A development of the invention provides that the electrical connection is established via a plug-in connection. The plug-in connection may therefore take the place of the screw connection. The plug-in connection has the advantage over the screw connection that it can be released more quickly and easily. The plug-in connection usually has a male part and a female part. The male part has at least one outwardly pointing contact pin, while the female part has a contact opening for receiving the contact pin. The male part may take the form of a plug or built-in plug; the female part may take the form of a coupling or a socket. Either the male part or the female part of the plug-in connection is on the brush holder, while the other part is assigned to the electronics unit. This other part may in this case be fixed in place on the electronics unit or alternatively be electrically connected to it flexibly via a cable. It is of course also possible for this to be implemented the other way around, that is to say one part is fixed in place on the electronics unit and the other is electrically connected to the brush holder flexibly via the cable.

A development of the invention provides that the electrical connection is established by means of a spring element, which urges a contact of the electronics unit in the direction of a contact of the brush holder, or vice versa. In the case of such an embodiment, it is preferably provided that the electrical connection is automatically made after the brush holder is brought into the guiding recess or into its assembly position. For this purpose, the contacts are arranged in relation to one another in such a way that they can enter into electrical connection with one another after the assembly of the brush holder in the guiding recess. Provided in particular for this purpose is the spring element, which urges the contact of the electronics unit in the direction of the contact of the brush holder. The electrical connection between the electronics unit and the contact assigned to it may in principle be established in any way desired. For example, it is via the spring element. Of course it is also possible instead of the embodiment described here that the spring element is assigned to the brush holder, so that the contact thereof is urged in the direction of the contact of the electronics unit.

A development of the invention provides that the electrical connection is established by means of a positively engaging connection, in particular a crimp connection. In the case of such an embodiment, the contact of the electronics unit is electrically connected to the contact of the brush holder by the positively engaging connection after the assembly of the brush holder in the guiding recess. It is in this case provided in particular that the crimp connection is established, that is to say that the two contacts are crimped.

A development of the invention provides that the electrical connection is established by a material-bonding connection of at least one contact of the electronics unit to at least one contact of the brush holder. The material-bonding connection may be provided instead of the positively engaging and non-positively engaging connections described above for establishing the electrical connection. The material-bonding connection should be understood at this point as advantageously meaning a welded connection or soldered connection. The material-bonding connection connects the contact of the electronics unit to the contact of the brush holder, a conductive material being used as the connecting material.

A development of the invention provides that the brush holder receives at least two brushes spaced apart in the axial direction and/or that there are a number of guiding recesses, which are arranged offset in the circumferential direction and respectively receive a brush holder. In order to supply the exciter winding of the rotor with electrical current, usually at least two sliding contacts are necessary. For this reason, at least two slip rings and at least two brushes are provided. These brushes may be arranged in a common brush holder, it being particularly preferred for them to be arranged offset in relation to one another or spaced apart from one another in the axial direction. In addition or alternatively, to improve the electrical connection between the electronics unit and the exciter winding it is also possible for a number of brushes that are offset in the circumferential direction to be assigned to each slip ring. These brushes are arranged in guiding recesses, which are correspondingly likewise arranged offset in relation to one another in the circumferential direction. Each of the guiding recesses in this case receives at least one brush holder.

The brush holders or the associated brushes may merely be offset in relation to one another in the circumferential direction, that is to say be provided at the same position in the axial direction. In this case, the brushes provided at the same axial position are preferably switched in parallel with one another. In this way, the reliability of the electrical connection can be improved. It may of course also be provided that, although the guiding recesses or brushes are offset in relation to one another in the circumferential direction, they are also additionally spaced apart from one another in the axial direction. A combination of the two embodiments can also be implemented. In the case of this combination, for each axial position there are at least two guiding recesses arranged offset in relation to one another in the circumferential direction and corresponding brushes.

The invention also relates to a method for producing an electrical machine, in particular an electrical machine according to the statements made above. When producing the electrical machine or during the assembly thereof, it is envisaged to arrange the brush displaceably in the brush holder and then introduce the brush holder together with the brush into the guiding recess of the electronics unit of the electrical machine and fasten it exchangeably in said guiding recess. The fastening is in this case provided exclusively between the brush holder and the electronics unit. The brush is not connected to the electronics unit directly, but only indirectly via the brush holder.

The invention also relates to a method for exchanging a brush of an electrical machine, in particular an electrical machine according to the statements made above. In this case, it is provided that a first brush is removed together with a first brush holder from the guiding recess of the electronics unit and then a second brush is introduced together with a second brush holder into the guiding recess of the electronics unit. Subsequently, the brush holder is exchangeably fastened in the guiding recess.

BRIEF DESCRIPTION OF THE DRAWINGS

The invention is explained in more detail below on the basis of the exemplary embodiments that are represented in the drawing, without restricting the invention. In the drawing.

DETAILED DESCRIPTION

Figure 1:
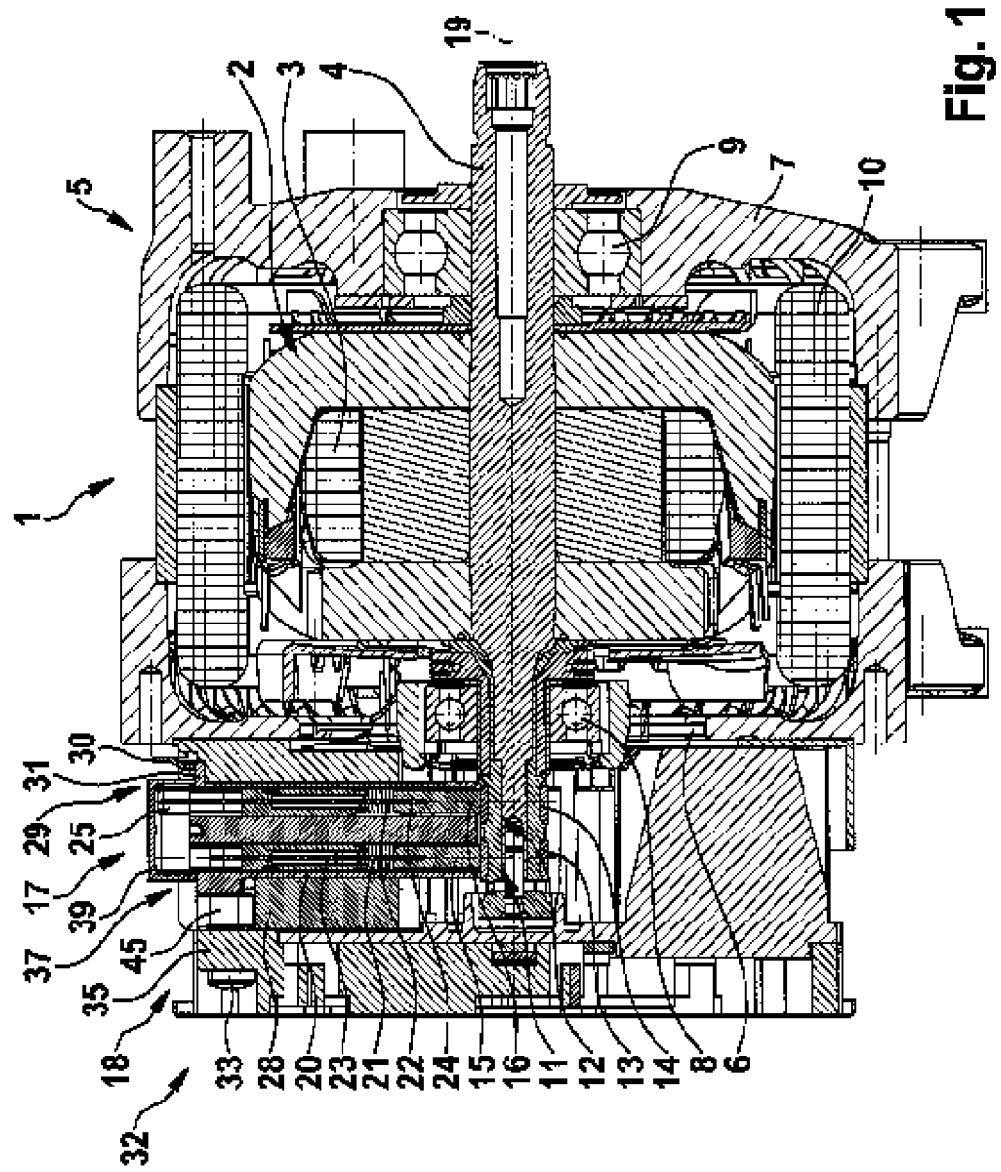
FIG. 1 shows a longitudinal section through an electrical machine, an electronics unit having a guiding recess, in which a brush holder with a brush that is involved in forming a sliding contact with an exciter winding of a rotor is displaceably arranged.

FIG. 1 shows a longitudinal section of an electrical machine 1, which can be used for example as an electric motor, generator or stator generator, in particular of a boost-recuperation system. The electrical machine 1 has a rotor 2, which has an exciter winding 3. The rotor 2 is to this extent an electrically excited rotor 2. The rotor 2 is arranged on a rotor shaft 4 to rotate therewith and by means of the shaft is mounted rotatably in a machine housing 5. The machine housing is made up substantially of bearing plates 6 and 7, in which bearings 8 and 9, in particular ball bearings, for bearing the rotor shaft 4 in the machine housing 5 are also fastened. A stator 10 of the electrical machine 1 is fixed on both sides by the bearing plates 6 and 7. Current is applied to the exciter winding 3 via sliding contacts 11 and 12. The sliding contacts 11 and 12 respectively consist of a slip ring 13 or 14 and a brush 15 or 16. The slip rings 13 and 14 are attached to the rotor shaft 4 and are in electrical connection with the exciter winding 3 via electrical connections (not represented) that are likewise on said rotor shaft.

The sliding contacts 11 and 12 are assigned together with their slip rings 13 and 14 and the brushes 15 and 16 to a sliding contact subassembly 17. The brush 15 is in electrical connection with the slip ring 13 and the brush 16 is in electrical connection with the slip ring 14. In this way, electrical current can be fed to the exciter winding 3 of an electronics unit 18 via the sliding contacts 11 and 12 when the electrical machine 1 is being operated. The brushes 15 and 16 are arranged spaced apart from one another in the axial direction—with respect to a longitudinal axis of the electrical machine 1 or an axis of rotation 19 of the rotor 2. They are in a brush holder 20, in which they are mounted displaceably in the radial direction (once again with respect to the axis of rotation 19). In the brush holder 20 there are spring elements 21 and 22, the spring element 21 urging the brush 15 and the spring element 22 urging the brush 16 inwardly in the radial direction, that is to say in the direction of the rotor shaft 4 or the slip rings 13 and 14. The spring elements 21 and 22 ensure that the brushes 15 and 16 are pressed against the slip rings 13 and 14.

Each of the brushes 15 and 16 is assigned a line 23 or 24, respectively, which lines are in particular in the form of stranded wires. The line 23 is connected on its one side to the brush 15 and on its other side to a busbar 25. The brush 16 is in electrical connection via the line 24 with a busbar 26 (cannot be seen here because the busbar 26 lies behind the busbar 25). The brush holder 20 is fastened in a guiding recess 27 of the electronics unit 18. In particular, the guiding recess 27 lies in a housing 28 of the electronics unit 18, in particular a filter subassembly not represented here (for example an EMC filter subassembly) of the electronics unit 18. Alternatively, the guiding recess 27 may also be assigned to a heat sink or some other element of the electronics unit 18. The brush holder 20 is exchangeably fastened to the guiding recess 27. This means that, in particular for exchanging at least one of the brushes 15 and 16, it can (only) be removed together with said brushes from the guiding recess 27 and replaced by a new brush holder 20 with new brushes 15 and 16.

The fastening of the brush holder 20 in the guiding recess 27 may be designed with non-positive engagement or positive engagement. In the first case, the brush holder 20 is pressed into the guiding recess 27, so that it is held in it by a clamping effect. It is preferred however for a positively engaging fastening to be provided, in particular in the form of a latching connection 29. The latching connection consists of a latching element 30 and a latching counter-element 31. The latching element 30 takes the form here of a latching tongue. During the assembly of the electrical machine 1, in particular when introducing the brush holder 20 into the guiding recess 27, the latching element 30 is resiliently deflected out of a starting position. When the brush holder 20 reaches its final assembly position within the guiding recess 27, the latching element 30 can thus resiliently return at least partially into its starting position. In this position, it grips behind a latching counter-element 31, so that a latching connection is established between the latching element 30 and the latching counter-element 31 to form the latching connection 29.

In the embodiment represented here, the latching element 30 is on the electronics unit 18 or the housing 28 thereof. The latching counter-element 31 is formed by a region of the brush holder 20, in particular by an axial projection. Conversely, the latching element 30 may of course also be on the brush holder 20 and the latching counter-element 31 may be on the electronics unit 18.

In addition to the mechanical connection established by means of the latching connection 29 between the brush holder 20 and the electronics unit 18 or the housing 28 thereof, an electrical connection must be established between the electronics unit 18 and the brush holder 20. This is provided for example via a screw connection 32, which has a number of screws 33 and 34 corresponding to the number of busbars 25 and 26, the screw 34 not being visible because it is arranged behind the screw 33. Therefore, the busbar 25 is electrically connected via the screw 33 and the busbar 26 is electrically connected via the screw 34, and correspondingly the brush 15 or the brush 16 is electrically connected to the electronics unit 18.

Alternatively, the electrical connection may of course also be established in some other way, for example via a plug-in connection, by means of a spring element, by means of a positively engaging connection or by a material-bonding connection. The screws 33 and 34 are pushed through contacts 35 and 36 of the electronics unit 18 and screwed to contacts 37 or 38 of the electronics unit 18. The contacts 37 and 38 are formed for this purpose as contact bars, which are assigned nuts 45 and 46 or which have nuts 45 and 46. The nuts 45 and 46 have an internal thread for receiving the screws 33 and 34. The brush holder 20 or the region protruding beyond the electronics unit 18 is substantially covered by a covering cap 39. This screwing of the screws 33 and 34 into the nuts 45 and 46 has the effect that the contacts 35 and 36 are urged in the direction of the contacts 37 and 38.

Figure 2:
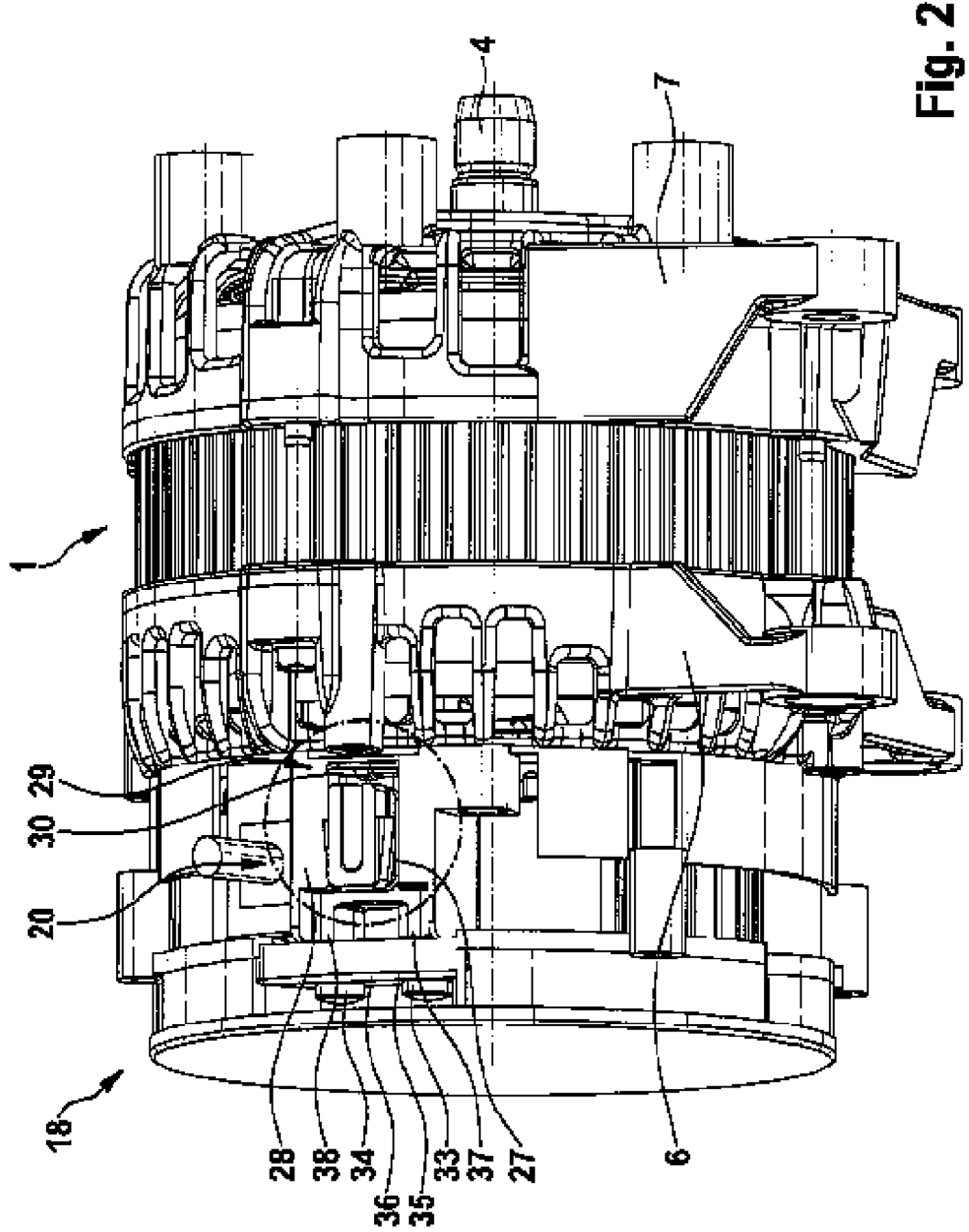
FIG. 2 shows a side view of the electrical machine.

FIG. 2 shows a side view of the electrical machine 1. The screws 33 and 34 via which the electrical connection between the contacts 35 and 36 and the contacts 37 and 38 is respectively established can be clearly seen. The brush holder 20, which is held in the guiding recess 27 by means of the latching element 30 of the latching connection 29, can also be seen. During a disassembly of the brush holder 20 (for example in the case of servicing), first the screws 33 and 34 must be loosened and then the latching connection 29 released. Subsequently, the brush holder 20 can be removed from the guiding recess 27 without any problem. In the exemplary embodiment that is represented here, the latching element 30 is part of the housing 28 of the electronics unit 18. However, as already stated above, the latching element 30 may be attached to the brush holder 20 and engage in a latching counter-element 31 assigned to the guiding recess 27 (by analogy with the latching connection of an RJ45 network plug).

Figure 3:
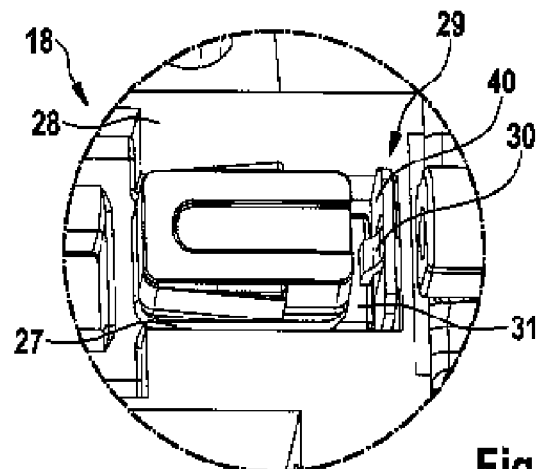
FIG. 3 shows a detail taken from the electrical machine shown in FIG. 2.

FIG. 3 shows a view of a detail of the region highlighted in FIG. 2. The latching counter-element 31 of the latching connection 29 can be seen, as it interacts with the latching counter-element 31 of the brush holder 20. It is clear that the latching element 30 is assigned an actuating part 40, which has a larger surface area than the latching element 30. By means of the actuating region 40, easy actuation and release of the latching connection 29 is possible, that is to say a resilient deflection of the latching element 30 in the direction away from the latching counter-element 31.

Figure 4:
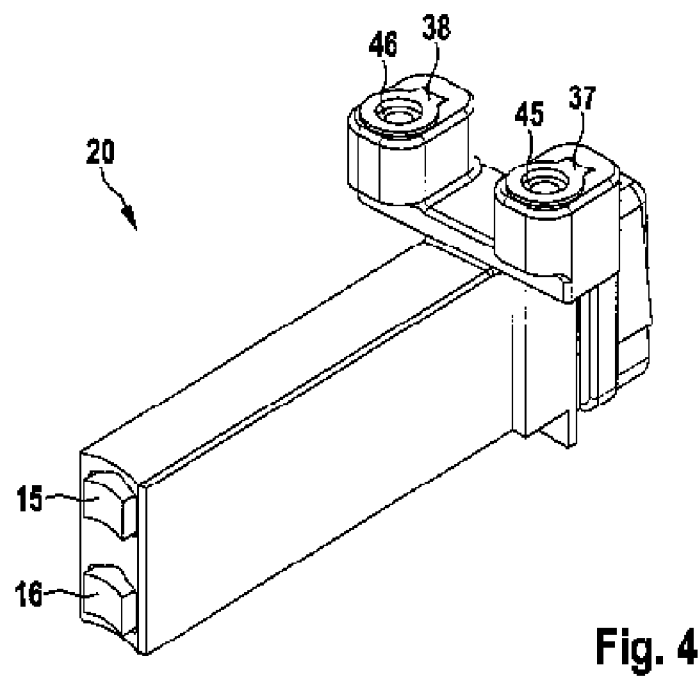
FIG. 4 shows the brush holder in a first embodiment.

FIG. 4 shows the brush holder 20 in a first embodiment. In the case of this embodiment, the contacts 37 and 38 are aligned in such a way that, after assembly of the brush holder 20 in the guiding recess 27 has taken place, the screws 33 and 34 are aligned with their longitudinal axes in the axial direction. As already stated above, the contacts 37 and 38 are formed as nuts, so that the screws 33 and 34 can be screwed into them.

Figure 5:
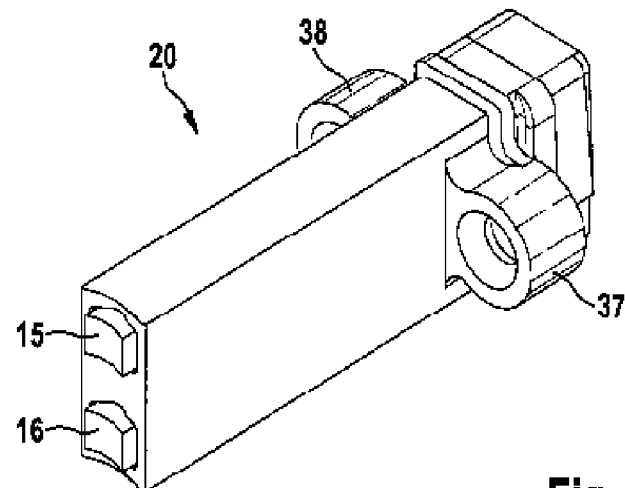
FIG. 5 shows the brush holder in a second embodiment.

FIG. 5 shows a second embodiment of the brush holder 20. In the case of this embodiment, the contacts 37 and 38 are configured without an internal thread, while the contacts 35 and 36 of the electronics unit 18 have an internal thread. In this embodiment, the screws 33 and 34 are first led through the contacts 37 and 38 and then screwed to the contacts 35 and 36 of the electronics unit 18.

Figure 6:
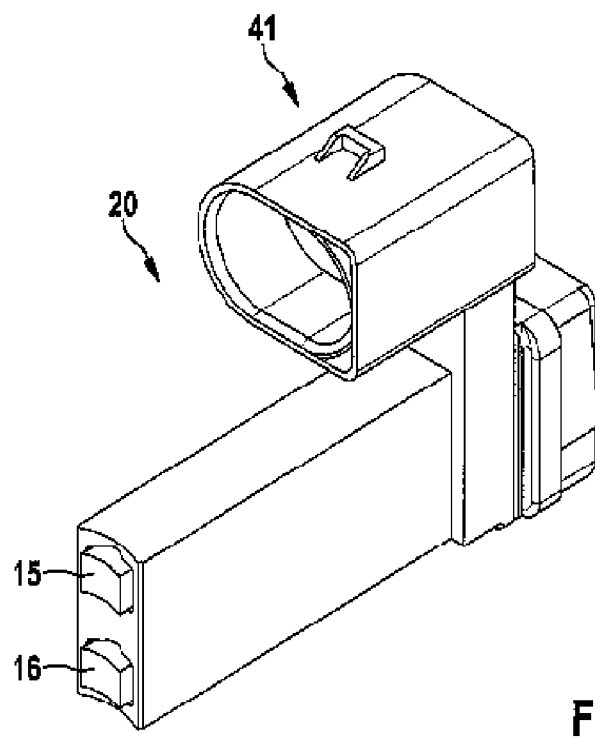
FIG. 6 shows the brush holder in a third embodiment.

FIG. 6 shows a third embodiment of the brush holder 20. Here, the electrical connection between the brushes 15 and 16 and the electronics unit 18 is established via a plug-in connection 41.

Figure 7:
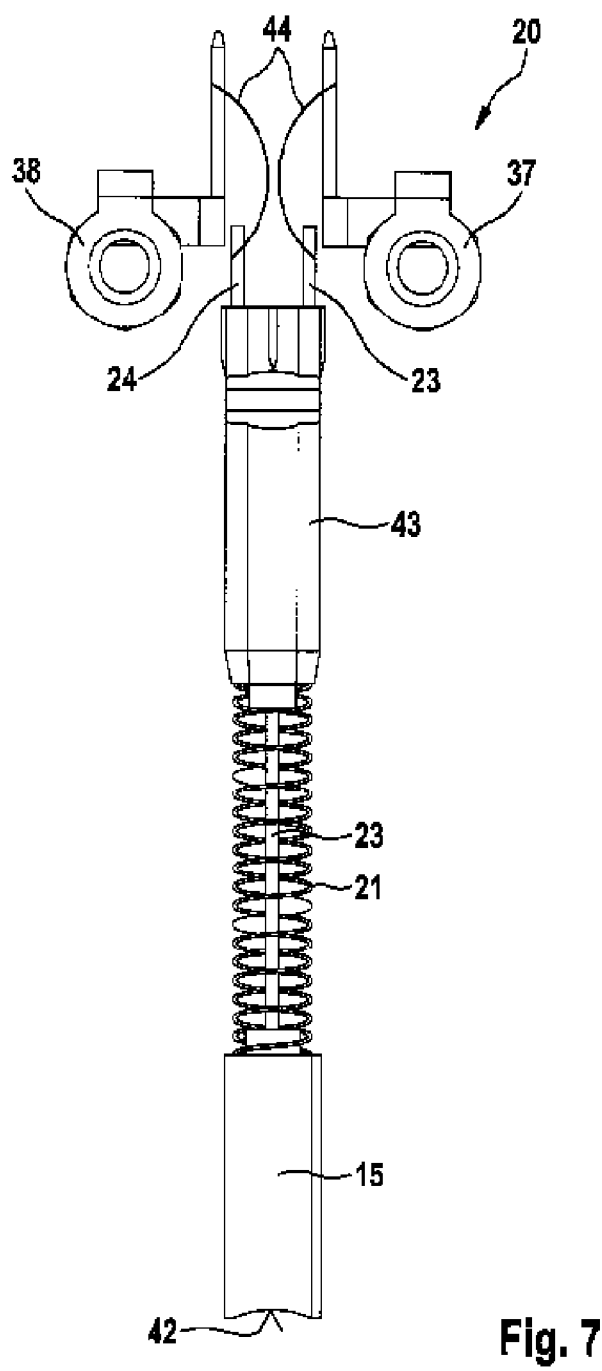
FIG. 7 shows a schematic representation of the brush holder and the brush arranged therein.

FIG. 7 shows a schematic view of the brush holder 20 in a specific design corresponding to the embodiment according to FIGS. 1 to 4. All that can be seen is the brush 15 with a contact area 42, which is concavely formed and via which the brush 15 enters into electrical connection with the slip ring 13. In the brush holder 20, each brush 15 or 16 is assigned the spring element 21 or 22, respectively, which urges the corresponding brush 15 or 16 in the direction of the respective slip ring 13 or 14. The spring element 21 is formed as a spiral spring and receives inside it the line 23, via which the brush 15 is in electrical connection with the contact 37. It goes without saying that the same applies correspondingly to the brush 16 and the spring element 22. The lines 23 and 24 are fastened on their side facing away from the brushes 15 and 16 in a holder 43 and reach through said holder in the direction of the contacts 37 and 38. On the side of the holder 43 facing away from the brushes 15 and 16, the lines 23 and 24 are electrically connected to the contacts 37 and 38, for example via flexible conductors 44. It goes without saying that the lines 23 and 24 may alternatively also be connected to the contacts 37 and 38 directly.

Figure 8:
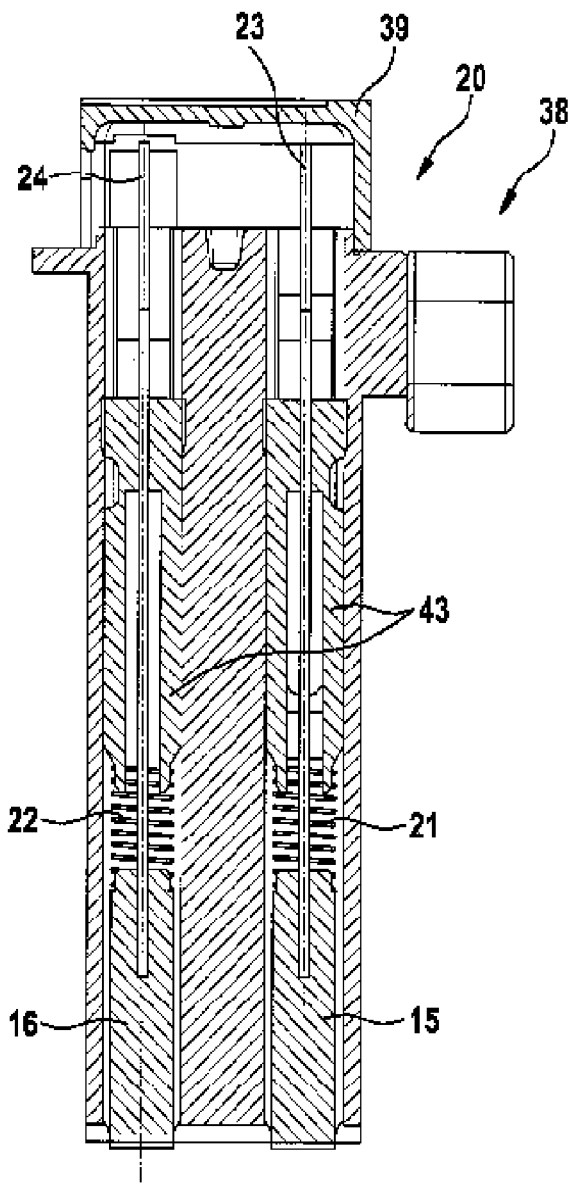
FIG. 8 shows the brush holder in a side sectional view.

FIG. 8 shows a cross section through the brush holder 20 and the covering cap 39. In this case, the brushes 15 and 16 are located in a position in which they are after the assembly of the brush holder 20 in the guiding recess 27. In this case, they are urged from the slip rings 13 and 14 in the radial direction onto the holder 43 while the spring elements 21 and 22 are compressed.

Figure 9:
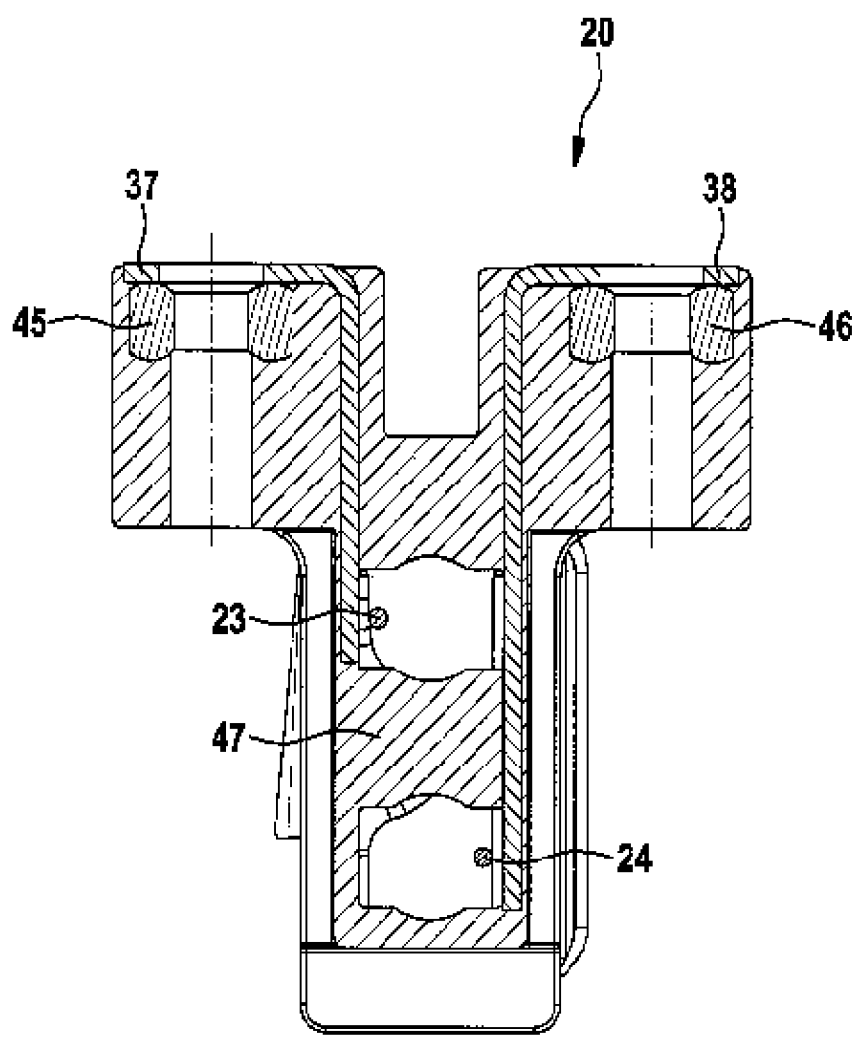
FIG. 9 shows a detailed sectional view of the brush holder.

FIG. 9 finally shows a cross section of a detail of the brush holder 20 in the region of the contacts 37 and 38. It is clear that the contacts 37 and 38 are formed as contact bars, which are arranged between nuts 45 and 46 and the contacts 35 and 36 of the electronics unit 18 (not shown here). When the screw connection 32 is established by means of the screws 33 and 34 (likewise not shown), the contacts 37 and 38 are therefore clamped between the nuts 45 and 46 and the contacts 35 and 36, whereby the electrical connection is established. The contacts 37 and 38 are also formed in such a way that they establish an electrical connection with the respective line 23 or 24. For this purpose, they are led at least partly through the brush holder 20 or a housing 47 of the brush holder 20.

The invention claimed is:

1. An electrical machine (1) comprising a machine housing (5) receiving an electrically excited rotor (2) and a stator (10), wherein the rotor (2) is arranged on a rotor shaft (4) for rotation about an axis of rotation (19), and an electronics unit (18) having a housing (28) fastened to the machine housing (5) on a first end of the machine housing (5), wherein the machine housing (5) is at least partially made up of first and second bearing plates (6, 7), in which are respectively fastened, first and second bearings (8, 9) for bearing the rotor shaft (4), wherein the electronics unit (18) is electrically connected to an exciter winding (3) of the rotor (2) via at least one sliding contact (11, 12), the sliding contact including at least one slip ring (13, 14) assigned to the rotor (2) and at least two brushes (15, 16) assigned to the electronics unit (18), the at least two brushes (15, 16) being arranged displaceably in a brush holder (20) and spaced apart axially relative to the axis of rotation (19), wherein the brush holder (20) is fastened exchangeably in a guiding recess (27) formed in the housing (28) of the electronics unit (18) to facilitate removal of the brush holder (20) and exchange of the at least two brushes (15, 16) without disassembly of the electronics unit (18) and without separation of the electronics unit housing (28) from the machine housing (5), wherein the brush holder (20) further comprises contacts (37, 38), each contact (37, 38) formed as a contact bar and having an internally-threaded nut (45, 46) aligned with a respective cavity, the respective cavities being spaced apart in a circumferential direction of the housing (28) of the electronics unit (18), the nuts (45, 46) being axially spaced from the at least two brushes (15, 16), and a groove being located between the contacts (37, 38), and wherein the electronics unit (18) is fastened to the first bearing plate (6) of the machine housing (5).

2. The electrical machine according to claim 1, characterized in that the fastening of the brush holder (20) in the guiding recess (27) is with non-positive or positive engagement.

3. The electrical machine according claim 2, characterized in that a positively engaging connection is established by a latching connection (29) having a latching element (30) and a latching counter-element (31).

4. The electrical machine according to claim 1, characterized in that an electrical connection between the electronics unit (18) and the brush holder (20) is established via a screw connection (32).

5. The electrical machine according to claim 4, characterized in that the screw connection (20) comprises at least one screw (33, 34), which is arranged in an axial direction or a radial direction.

6. The electrical machine according to claim 1, characterized in that an electrical connection between the electronics unit (18) and the brush holder (20) is established by means of a positively engaging connection.

7. The electrical machine according to claim 1, characterized in that there are a number of guiding recesses (27), which are arranged offset in a circumferential direction and respectively receive at least one brush holder (20).

8. The electrical machine according to claim 1, characterized in that the electronics unit (18) is fastened to the first bearing plate (6) of the machine housing (5) on a side of the first bearing plate (6) facing away from the second bearing (9) so that the at least two brushes (15, 16) are not located axially between the first and second bearings (8, 9).

\* \* \* \* \*